(12) United States Patent
Tokach et al.

(10) Patent No.: US 11,052,715 B2
(45) Date of Patent: Jul. 6, 2021

(54) LOADER SUSPENSION

(71) Applicant: Clark Equipment Company, West Fargo, ND (US)

(72) Inventors: Thomas J. Tokach, Mandan, ND (US); Daniel J. Krieger, Bismarck, ND (US); Jeffrey A. Dahl, Bismarck, ND (US)

(73) Assignee: CLARK EQUIPMENT COMPANY, West Fargo, ND (US)

( * ) Notice: Subject to any disclaimer, the term of this patent is extended or adjusted under 35 U.S.C. 154(b) by 76 days.

(21) Appl. No.: 16/179,140

(22) Filed: Nov. 2, 2018

(65) Prior Publication Data

US 2019/0126701 A1 May 2, 2019

Related U.S. Application Data

(60) Provisional application No. 62/580,743, filed on Nov. 2, 2017.

(51) Int. Cl.
*B60G 3/20* (2006.01)
*E02F 3/34* (2006.01)
*B60G 11/22* (2006.01)

(52) U.S. Cl.
CPC ............... *B60G 3/20* (2013.01); *B60G 11/22* (2013.01); *E02F 3/3414* (2013.01);
(Continued)

(58) Field of Classification Search
CPC .... B60G 3/20; B60G 11/22; B60G 2200/144; B60G 2300/022; B60G 2300/09;
(Continued)

(56) References Cited

U.S. PATENT DOCUMENTS 214,329 A 4/1879 Vose
2,611,625 A 9/1952 Kishline et al.
(Continued)

FOREIGN PATENT DOCUMENTS

DE 4115932 A1 12/1992
EP 0182607 A2 5/1986
EP 2189308 A1 5/2010

OTHER PUBLICATIONS

International Search Report and Written Opinion dated Feb. 15, 2019 for International Application No. PCT/US2018/058925 filed Nov. 2, 2018, 16 pages.

*Primary Examiner* — Toan C To
(74) *Attorney, Agent, or Firm* — John Veldhuis-Kroeze; Westman, Champlin & Koehler, P.A.

(57) ABSTRACT

The present disclosure includes independent suspension systems or members, as well as wheeled skid steer loaders or other power machines including the same, that couple each wheel to a machine frame using a four-bar linkage, with the four bars including the frame of the machine, an upper control arm, a lower control arm, and a wheel carrier link. Each control arm is pivotally attached to both the machine frame and one end of the wheel carrier link. The four pivots between the control arms and the wheel carrier link are configured to all be contained within cylinder defined by the outer diameter of the wheel rim, allowing for a compact structure with the wheel carrier link and at least part of the control arms being positioned within this volume when the loader is in a resting position.

20 Claims, 8 Drawing Sheets

(52) U.S. Cl.
CPC .. *B60G 2200/144* (2013.01); *B60G 2200/422* (2013.01); *B60G 2202/143* (2013.01); *B60G 2300/022* (2013.01); *B60G 2300/08* (2013.01); *B60G 2300/09* (2013.01); *B60Y 2200/41* (2013.01)

(58) Field of Classification Search
CPC ........ B60G 2200/422; B60G 2202/143; B60G 2300/08; E02F 3/3414; B60Y 2200/41
USPC .................................. 280/124.134, 124.135
See application file for complete search history.

(56) References Cited

U.S. PATENT DOCUMENTS

| | | | |
|---|---|---|---|
| 2,643,877 A | 6/1953 | Hirst | |
| 4,186,815 A | 2/1980 | Hart | |
| 4,279,566 A | 7/1981 | Sagaser et al. | |
| 4,285,627 A | 8/1981 | Oswald et al. | |
| 4,568,095 A | 2/1986 | Bogner et al. | |
| 5,547,207 A | 8/1996 | Madler | |
| 6,113,119 A * | 9/2000 | Laurent | B60G 3/01 280/124.1 |
| 6,123,351 A * | 9/2000 | Bruehl | B60G 3/20 280/124.135 |
| 6,257,604 B1 * | 7/2001 | Laurent | B60G 3/01 267/68 |
| 6,488,110 B2 | 12/2002 | Price | |
| 6,584,710 B1 | 7/2003 | Lin et al. | |
| 6,648,352 B2 | 11/2003 | Felsing et al. | |
| 6,663,114 B2 | 12/2003 | Lamela et al. | |
| 6,761,234 B1 | 7/2004 | Lamela et al. | |
| 6,779,623 B2 * | 8/2004 | Woods | B60G 3/18 180/257 |
| 7,000,724 B2 | 2/2006 | Lamela et al. | |
| 7,044,258 B2 | 5/2006 | Lamela et al. | |
| 7,044,482 B2 | 5/2006 | Shore | |
| 7,198,121 B2 | 4/2007 | Lamela et al. | |
| 7,226,064 B2 | 6/2007 | Shore | |
| 7,296,642 B1 | 11/2007 | DeWald | |
| 7,318,595 B2 | 1/2008 | Lamela et al. | |
| 7,401,794 B2 * | 7/2008 | Laurent | B60G 3/01 280/124.134 |
| 7,416,188 B2 | 8/2008 | Segerljung | |
| 7,527,117 B2 | 5/2009 | Strong | |
| 7,527,118 B2 | 5/2009 | Bushinski | |
| 7,644,938 B2 * | 1/2010 | Yamada | B60G 3/01 280/124.126 |
| 7,958,959 B2 * | 6/2011 | Yogo | B60G 3/20 180/65.51 |
| 7,967,087 B2 | 6/2011 | Arulraja et al. | |
| 8,360,179 B2 | 1/2013 | Daniels et al. | |
| 8,573,336 B2 | 11/2013 | Arulraja et al. | |
| 8,794,358 B2 | 8/2014 | Hansen | |
| 8,925,940 B2 * | 1/2015 | Mighell | B62K 5/027 180/210 |
| 2002/0035824 A1 | 3/2002 | Ferris et al. | |
| 2004/0135336 A1 * | 7/2004 | Lamela | B60G 3/08 280/124.1 |
| 2006/0208447 A1 * | 9/2006 | Eshelman | B60G 11/28 280/124.135 |
| 2006/0244235 A1 | 11/2006 | Kusaka et al. | |
| 2008/0203693 A1 * | 8/2008 | Yamada | B60G 3/01 280/124.127 |
| 2009/0194965 A1 * | 8/2009 | Boston | B60G 3/20 280/124.136 |
| 2010/0117324 A1 * | 5/2010 | Hirai | B60G 3/20 280/124.135 |
| 2011/0025012 A1 * | 2/2011 | Nakamura | B60G 3/20 280/124.135 |
| 2012/0326412 A1 | 12/2012 | VanDenberg et al. | |
| 2015/0084301 A1 | 3/2015 | Johnson | |

* cited by examiner

LOADER SUSPENSION

CROSS-REFERENCE TO RELATED APPLICATION

This application claims the benefit of U.S. Provisional Application No. 62/580,743, which was filed on Nov. 2, 2017.

BACKGROUND

The present disclosure is related to a suspension system for power machines and more particularly to suspension systems for wheeled skid-steer loaders. Power machines, for the purposes of this disclosure, include any type of machine that generates power for the purpose of accomplishing a particular task or a variety of tasks. One type of power machine is a work vehicle. Work vehicles are generally self-propelled vehicles that have a work device, such as a lift arm assembly (although some work vehicles can have other work devices) that can be manipulated to perform a work function. Some examples of work vehicle power machines include loaders, excavators, utility vehicles, tractors, and trenchers, to name a few.

One type of popular work vehicle is compact wheeled skid-steer loaders. Wheeled skid-steer loaders are versatile power machine that are capable of a zero-turn radius and thus are capable of working in tight areas. Wheeled skid-steer loaders have rigid axles in that none of the axles are capable of turning the wheels to accomplish steering. Rather, steering is accomplished by rotating the wheels on one side of the machine at a different speed and/or direction relative to another side of the machine so that the machine skids over a support surface such as the ground. However, axles on traditional skid-steer loaders are also rigid in that they are fixed (as opposed to suspended) to the frame and completely incapable of movement relative to the frame so that the coupling of the axles to the frame and wheels to the axle are not capable of absorbing shock that can be introduced such as by movement over uneven terrain or changes in velocity of movement of the loader.

The discussion above is merely provided for general background information and is not intended to be used as an aid in determining the scope of the claimed subject matter.

SUMMARY

This Summary and the Abstract are provided to introduce a selection of concepts in a simplified form that are further described below in the Detailed Description. The Summary and the Abstract are not intended to identify key features or essential features of the claimed subject matter.

The present disclosure includes independent suspension structures and systems, as well as wheeled skid-steer loaders or other power machines that employ the same. In some embodiments, the suspension system includes one or more suspension mechanisms that couple one or more wheels to a machine frame. In some embodiments, each of the one or more suspension structures includes a four-bar linkage, with the four bars including a portion of the frame of the machine, an upper control arm, a lower control arm, and a wheel carrier link. Each of the upper and lower control arms is pivotally attached to both the machine frame and one end of the wheel carrier link. Each of the pivots between the control arms and the wheel carrier link are configured to all be contained, in some embodiments, within a cylinder defined by the outer diameter of the wheel rim, allowing for a compact structure with the wheel carrier link and at least part of the control arms being positioned within this volume when the loader is in a resting position.

DETAILED DESCRIPTION

The concepts disclosed in this discussion are described and illustrated with reference to exemplary embodiments. These concepts, however, are not limited in their application to the details of construction and the arrangement of components in the illustrative embodiments and are capable of being practiced or being carried out in various other ways. The terminology in this document is used for the purpose of description and should not be regarded as limiting. Words such as "including," "comprising," and "having" and variations thereof as used herein are meant to encompass the items listed thereafter, equivalents thereof, as well as additional items.

The present disclosure is directed toward a suspension system that is used to couple tractive elements to a frame of a power machine. In some embodiments, the suspension system includes a plurality of independent suspension mechanisms, each of which operably couples a tractive element such as a wheel to the frame of a loader and more specifically to a skid-steer loader. Prior to discussing specific embodiments of suspension systems, a loader of the type on which such suspension systems can be advantageously employed will be discussed.

As will be described below in greater detail, in some embodiments, each suspension mechanism has an upper control arm and a lower control arm, and a wheel carrier link. Each control arm is pivotally attached to both the machine frame and one end of the wheel carrier link. The longitudinal axes about which the upper and lower control arms are pivotally attached to the machine frame and the lengths of the control arms are configured in a manner so as to orient the suspension members to provide improved performance. In addition, the four pivots between the control arms and the wheel carrier link are configured to all be contained within a cylinder defined by the outer diameter of the wheel rim, allowing for a compact structure with the wheel carrier link and at least part of the control arms being positioned within this volume when the loader is in a resting position.

Figure 1:
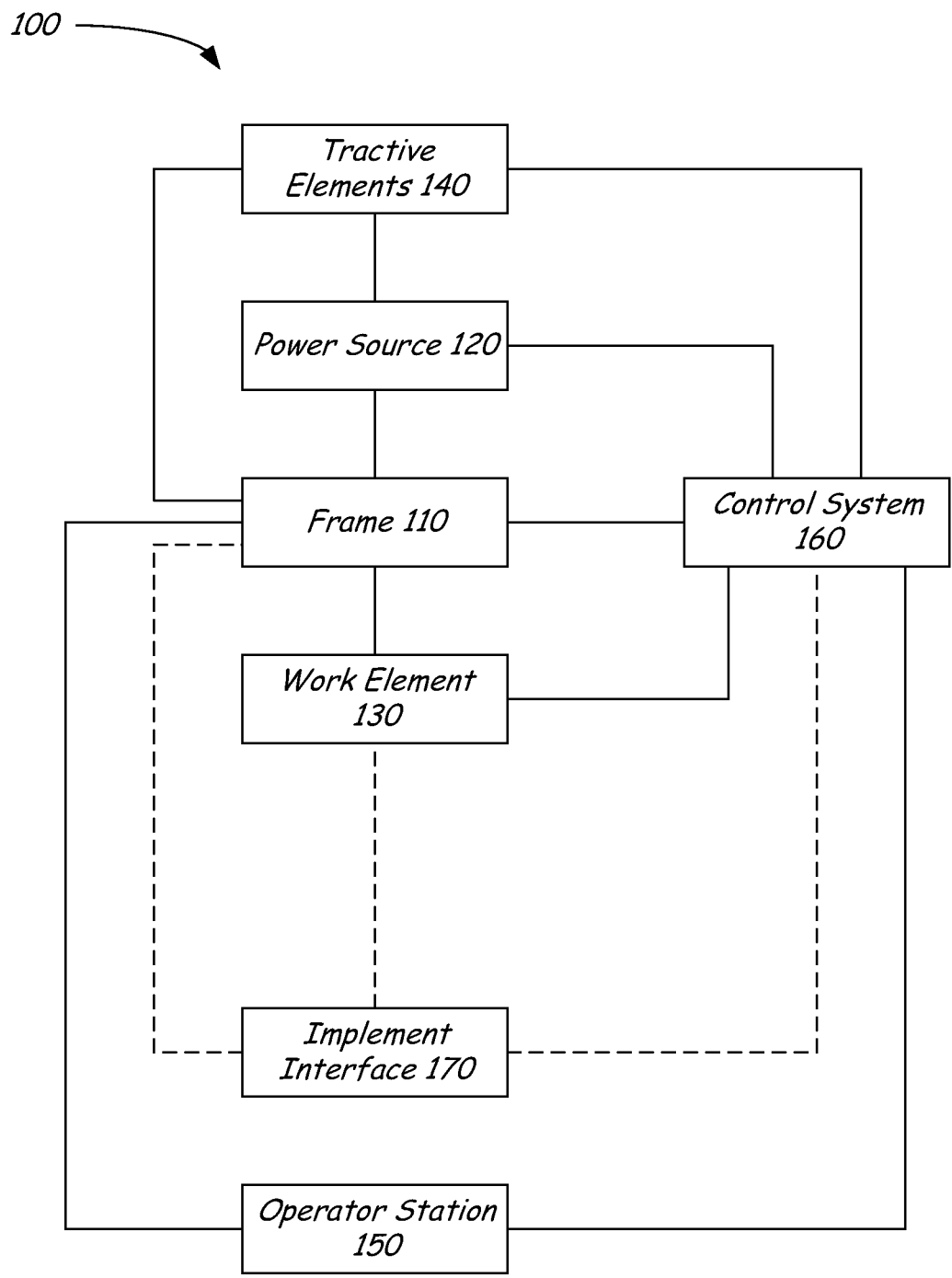
FIG. 1 is a block diagram illustrating functional systems of a representative power machine on which embodiments of the present disclosure can be advantageously practiced.

While the disclosed suspension systems are particularly useful in skid-steer loader type power machines, they are described more generally with utility in a representative power machine, such as illustrated in FIG. 1. Power machines, for the purposes of this discussion, include a frame, at least one work element, and a power source that is capable of providing power to the work element to accomplish a work task. One type of power machine is a skid steer loader.

FIG. 1 illustrates a block diagram including the basic systems of a small loader type of power machine 100 upon which the embodiments discussed below can be advantageously incorporated. The block diagram of FIG. 1 identifies various systems on power machine 100 and the relationship between various components and systems. The power machine 100 has a frame 110, a power source 120, and a work element 130. Because power machine 100 shown in FIG. 1 can be a self-propelled power machine, it is also shown to have tractive elements 140, which are themselves work elements provided to move the power machine over a support surface and an operator station 150 that provides an operating position for controlling the work elements of the power machine. In exemplary embodiments described below in greater detail, operator station 150 can include a seat (not shown) and other features. A control system 160 is provided to interact with the other systems to perform various work tasks at least in part in response to control signals provided by an operator.

Certain power machines have work elements that are capable of performing a dedicated task. For example, some power machines have a lift arm to which an implement, such as a bucket or the disclosed post driving implement, is attached such as by a pinning arrangement. The work element, i.e., the lift arm, can be manipulated to position the implement for the purpose of performing the task. The implement, in some instances can be positioned relative to the work element, such as by rotating the implement relative to a lift arm, to further position the implement. Under normal operation of such a power machine, the implement is intended to be attached and under use. Such power machines may be able to accept other implements by disassembling the implement/work element combination and reassembling another implement in place of the original implement. Other power machines, however, are intended to be used with a wide variety of implements and have an implement interface such as implement interface 170 shown in FIG. 1. At its most basic, implement interface 170 is a connection mechanism between the frame 110 or a work element 130 and an implement, which can be as simple as a connection point for attaching an implement directly to the frame 110 or a work element 130 or more complex, as discussed below.

On some power machines, implement interface 170 can include an implement carrier, which is a physical structure movably attached to a work element. The implement carrier has engagement features and locking features to accept and secure any of a number of implements to the work element. One characteristic of such an implement carrier is that once an implement is attached to it, it is fixed to the implement (i.e. not movable with respect to the implement) and when the implement carrier is moved with respect to the work element, the implement moves with the implement carrier. The term implement carrier as used herein is not merely a pivotal connection point, but rather a dedicated device specifically intended to accept and be secured to various different implements. The implement carrier itself is mountable to a structural member, typically a work element 130 such as a lift arm, or to the frame 110. Implement interface 170 can also include one or more power sources for providing power to one or more work elements on an implement. Some power machines can have a plurality of work elements with implement interfaces, each of which may, but need not, have an implement carrier for receiving implements. Some other power machines can have a work element with a plurality of implement interfaces so that a single work element can accept a plurality of implements simultaneously. Each of these implement interfaces can, but need not, have an implement carrier.

Frame 110 includes a physical structure that can support various other components that are attached thereto or positioned thereon. The frame 110 can include any number of individual components. Some power machines have frames that are rigid. That is, no part of the frame is movable with respect to another part of the frame. Other power machines have at least one portion that can move with respect to another portion of the frame.

Frame 110 supports the power source 120, which can provide power to one or more work elements 130 including the one or more tractive elements 140, as well as, in some instances, providing power for use by an attached implement via implement interface 170. Power from the power source 120 can be provided directly to any of the work elements 130, tractive elements 140, and implement interfaces 170. Alternatively, power from the power source 120 can be provided to a control system 160, which in turn selectively provides power to the elements that capable of using it to perform a work function. Power sources for power machines typically include an engine such as an internal combustion engine and a power conversion system such as a mechanical transmission or a hydraulic system that can convert the output from an engine into a form of power that is usable by a work element. Other types of power sources can be incorporated into power machines, including electrical sources or a combination of power sources, known generally as hybrid power sources.

FIG. 1 shows a single work element designated as work element 130, but various power machines can have any number of work elements. Work elements are typically attached to the frame of the power machine and movable with respect to the frame when performing a work task. In addition, tractive elements 140 are a special case of work element in that their work function is generally to move the power machine 100 over a support surface. Tractive elements 140 are shown separate from the work element 130 because many power machines have additional work elements besides tractive elements, although that is not always the case. Power machines can have any number of tractive elements, some or all of which can receive power from the power source 120 to propel the power machine 100. Tractive elements can be, for example, skid steer loader wheels attached to an axle. Tractive elements can be mounted to the frame such that movement of the tractive element is limited to rotation about an axle (so that steering is accomplished by a skidding action).

Power machine 100 includes an operator station 150 that includes an operating position from which an operator can control operation of the power machine. Further, some power machines such as power machine 100 and others may be capable of being operated remotely (i.e. from a remotely located operator station) instead of or in addition to an operator station adjacent or on the power machine. This can include applications where at least some of the operator-controlled functions of the power machine can be operated from an operating position associated with an implement that is coupled to the power machine. Alternatively, with some power machines, a remote-control device can be provided (i.e. remote from both of the power machine and any implement to which is it coupled) that is capable of controlling at least some of the operator-controlled functions on the power machine.

Figure 2:
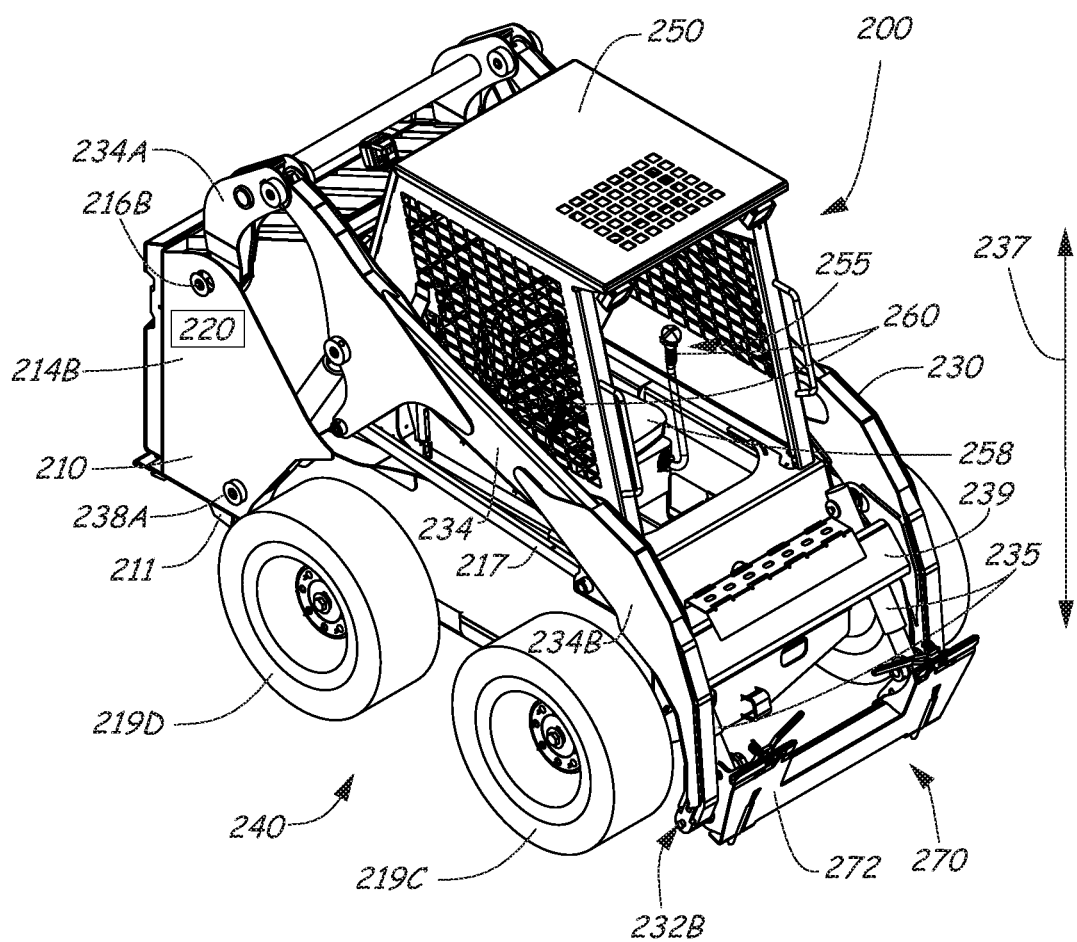
FIG. 2 is a front perspective view of a power machine on which embodiments disclosed in this specification can be advantageously practiced.
Figure 3:
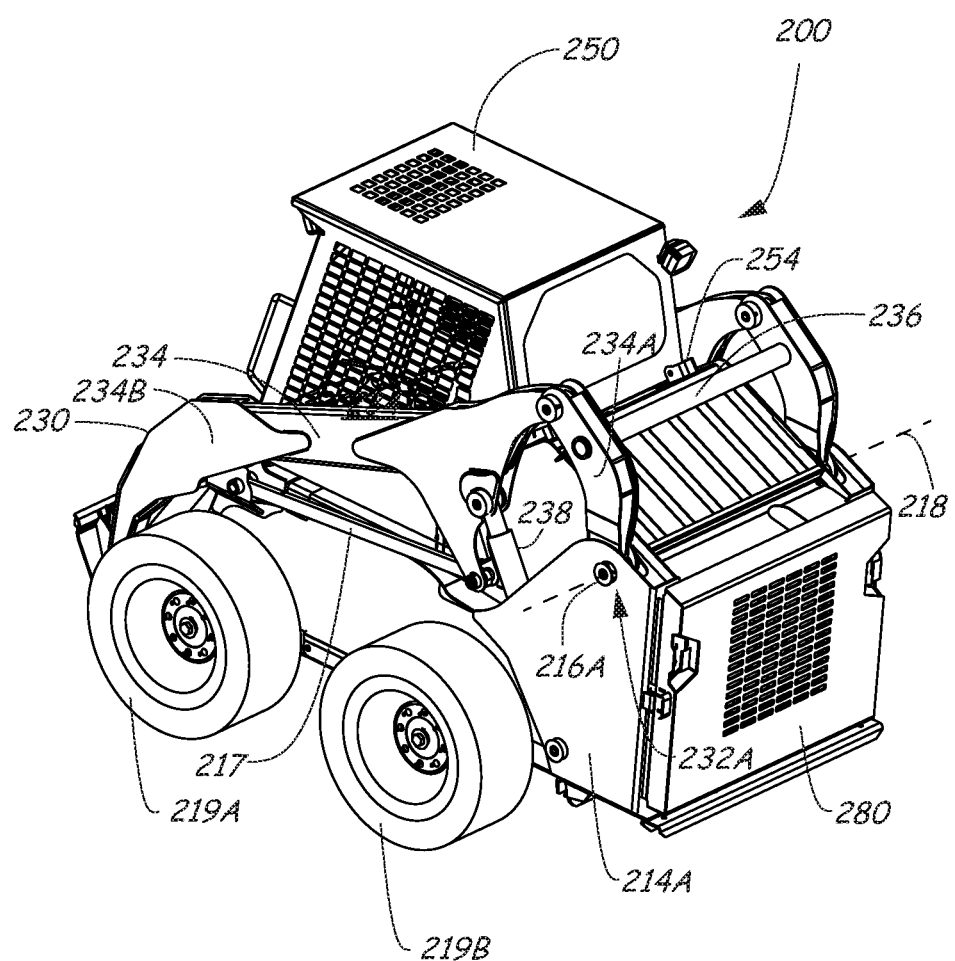
FIG. 3 is a rear perspective view of the power machine shown in FIG. 2.

FIGS. 2-3 illustrates a loader 200, which is one example of a power machine of the type illustrated in FIG. 1 where the embodiments discussed below can be advantageously employed. Loader 200 is a skid-steer loader and more particularly, a compact wheeled, as opposed to tracked, skid-steer loader. A wheeled skid-steer loader (for the purposes of this disclosure, simply "skid steer loader") is a loader that has wheels mounted on axes that are incapable of pivoting to affect a steering maneuver. Steering is accomplished by causing the wheels on one side to operate against the wheels to operate against the wheels on the other side to cause the loader 200 to skid across a support surface. Skid-steer loader 200 is one example of the power machine 100 illustrated broadly in FIG. 1 and discussed above. To that end, features of loader 200 described below include reference numbers that are generally similar to those used in FIG. 1. For example, loader 200 is described as having a frame 210, just as power machine 100 has a frame 110. Track loader 200 is described herein to provide a reference for understanding one environment on which the embodiments described below related to track assemblies and mounting elements for mounting the track assemblies to a power machine may be practiced. The loader 200 should not be considered limiting especially as to the description of features that loader 200 may have described herein that are not essential to the disclosed embodiments and thus may or may not be included in power machines other than loader 200 upon which the embodiments disclosed below may be advantageously practiced. Unless specifically noted otherwise, embodiments disclosed below can be practiced on a variety of power machines, with the loader 200 being only one of those power machines.

Loader 200 includes frame 210 that supports a power system 220, the power system can generate or otherwise providing power for operating various functions on the power machine. Frame 210 also supports a work element in the form of a lift arm structure 230 that is powered by the power system 220 and can perform various work tasks. As loader 200 is a work vehicle, frame 210 also supports a traction system 240, which is also powered by power system 220 and can propel the power machine over a support surface. The lift arm structure 230 in turn supports an implement carrier interface 270, which includes an implement carrier 272 that can receive and securing various implements to the loader 200 for performing various work tasks and power couplers 274, which are provided to selective provide power to an implement that might be connected to the loader. The loader 200 can be operated from within a cab 250 from which an operator can manipulate various control devices 260 to cause the power machine to perform various functions. Cab 250 can be pivoted back about an axis that extends through mounts 254 to access components as needed for maintenance and repair.

Various power machines that can include and/or interacting with the embodiments discussed below can have various different frame components that support various work elements. The elements of frame 210 discussed herein are provided for illustrative purposes and may not be the only type of frame that a power machine on which the embodiments can be practiced can employ. Frame 210 of loader 200 includes an undercarriage or lower portion 211 of the frame and a mainframe or upper portion 212 of the frame that is supported by the undercarriage. The mainframe 212 of loader 200 is attached to the undercarriage 211 such as with fasteners or by welding the undercarriage to the mainframe. Mainframe 212 includes a pair of upright portions 214A and 214B located on either side and toward the rear of the mainframe that support lift arm structure 230 and to which the lift arm structure 230 is pivotally attached. The lift arm structure 230 is illustratively pinned to each of the upright portions 214A and 214B. The combination of mounting features on the upright portions 214A and 214B and the lift arm structure 230 and mounting hardware (including pins used to pin the lift arm structure to the mainframe 212) are collectively referred to as joints 216A and 216B (one is located on each of the upright portions 214) for the purposes of this discussion. Joints 216A and 216B are aligned along an axis 218 so that the lift arm structure is capable of pivoting, as discussed below, with respect to the frame 210 about axis 218. Other power machines may not include upright portions on either side of the frame or may not have a lift arm structure that is mountable to upright portions on either side and toward the rear of the frame. For example, some power machines may have a single arm, mounted to a single side of the power machine or to a front or rear end of the power machine. Other machines can have a plurality of work elements, including a plurality of lift arms, each of which is mounted to the machine in its own configuration. Frame 210 also supports a pair of tractive elements 219A and 219B on either side of the loader 200, which on loader 200 are track assemblies.

The lift arm structure 230 shown in FIG. 1 is one example of many different types of lift arm structures that can be attached to a power machine such as loader 200 or other power machines on which embodiments of the present discussion can be practiced. The lift arm structure 230 has a pair of lift arms 234 that are disposed on opposing sides of the frame 210. A first end of each of the lift arms 234 is pivotally coupled to the power machine at joints 216 and a second end 232B of each of the lift arms is positioned forward of the frame 210 when in a lowered position as shown in FIG. 2. The lift arm structure 230 is moveable (i.e. the lift arm structure can be raised and lowered) under control of the loader 200 with respect to the frame 210. That movement (i.e. the raising and lowering of the lift arm structure 230) is described by a travel path, shown generally by arrow 237. For the purposes of this discussion, the travel path 237 of the lift arm structure 230 is defined by the path of movement of the second end 232B of the lift arm structure.

Each of the lift arms 234 of lift arm structure 230 as shown in FIG. 2 includes a first portion 234A and a second portion 234B that is pivotally coupled to the first portion 234A. The first portion 234A of each lift arm 234 is pivotally coupled to the frame 210 at one of the joints 216 and the second portion 234B extends from its connection to the first portion 234A to the second end 232B of the lift arm structure 230. The lift arms 234 are each coupled to a cross member 236 that is attached to the first portions 234A. Cross member 236 provides increased structural stability to the lift arm structure 230. A pair of actuators 238, which on loader 200 are hydraulic cylinders configured to receive pressurized fluid from power system 220, are pivotally coupled to both the frame 210 and the lift arms 234 at pivotable joints 238A and 238B, respectively, on either side of the loader 200. The actuators 238 are sometimes referred to individually and collectively as lift cylinders. Actuation (i.e., extension and retraction) of the actuators 238 cause the lift arm structure 230 to pivot about joints 216 and thereby be raised and lowered along a fixed path illustrated by arrow 237. Each of a pair of control links 217 are pivotally mounted to the frame 210 and one of the lift arms 232 on either side of the frame 210. The control links 217 help to define the fixed travel path of the lift arm structure 230. The lift arm structure 230 shown in FIG. 2 is representative of one type of lift arm structure that may be coupled to the power machine 100. Other lift arm structures, with different geometries, components, and arrangements can be pivotally coupled to the loader 200 or other power machines upon which the embodiments discussed herein can be practiced without departing from the scope of the present discussion. For example, other machines can have lift arm structures with lift arms that each has one portion (as opposed to the two portions 234A and 234B of lift arm 234) that is pivotally coupled to a frame at one end with the other end being positioned in front of the frame. Other lift arm structures can have an extendable or telescoping lift arm. Still other lift arm structures can have several (i.e. more than two) portions segments or portions. Some lift arms, most notably lift arms on excavators but also possible on loaders, may have portions that are controllable to pivot with respect to another segment instead of moving in concert (i.e. along a pre-determined path) as is the case in the lift arm structure 230 shown in FIG. 2. Some power machines have lift arm structures with a single lift arm, such as is known in excavators or even some loaders and other power machines. Other power machines can have a plurality of lift arm structures, each being independent of the other(s).

Implement interface 270 is provided at a second end 234B of the arm 234. The implement interface 270 includes an implement carrier 272 that is capable of accepting and securing a variety of different implements to the lift arm 230. Such implements have a machine interface that is configured to be engaged with the implement carrier 272. The implement carrier 272 is pivotally mounted to the second end 234B of the arm 234. Implement carrier actuators are operably coupled the lift arm structure 230 and the implement carrier 272 and are operable to rotate the implement carrier with respect to the lift arm structure.

The implement interface 270 also includes an implement power source 274 available for connection to an implement on the lift arm structure 230. The implement power source 274 includes pressurized hydraulic fluid port to which an implement can be coupled. The pressurized hydraulic fluid port selectively provides pressurized hydraulic fluid for powering one or more functions or actuators on an implement. The implement power source can also include an electrical power source for powering electrical actuators and/or an electronic controller on an implement. The implement power source 274 also exemplarily includes electrical conduits that are in communication with a data bus on the excavator 200 to allow communication between a controller on an implement and electronic devices on the loader 200.

The lower frame 211 supports and has attached to it a pair of tractive elements 219A and 219B. Each of the tractive elements 219A and 219B has a track frame that is coupled to the lower frame 211. The track frame supports and is surrounded by an endless track, which rotates under power to propel the loader 200 over a support surface. Various elements are coupled to or otherwise supported by the track frame for engaging and supporting the endless track and cause it to rotate about the track frame. For example, a sprocket is supported by the track frame and engages the endless track to cause the endless track to rotate about the track frame. An idler is held against the track by a tensioner (not shown) to maintain proper tension on the track. The track frame also supports a plurality of rollers, which engage the track and, through the track, the support surface to support and distribute the weight of the loader 200.

Loaders can include human-machine interfaces including display devices that are provided in the cab to give indications of information relatable to the operation of the power machines in a form that can be sensed by an operator, such as, for example audible and/or visual indications. Audible indications can be made in the form of buzzers, bells, and the like or via verbal communication. Visual indications can be made in the form of graphs, lights, icons, gauges, alphanumeric characters, and the like. Displays can be dedicated to provide dedicated indications, such as warning lights or gauges, or dynamic to provide programmable information, including programmable display devices such as monitors of various sizes and capabilities. Display devices can provide diagnostic information, troubleshooting information, instructional information, and various other types of information that assists an operator with operation of the power machine or an implement coupled to the power machine. Other information that may be useful for an operator can also be provided.

The description of power machine 100 and loader 200 above is provided for illustrative purposes, to provide illustrative environments on which the embodiments discussed below can be practiced. While the embodiments discussed can be practiced on a power machine such as is generally described by the power machine 100 shown in the block diagram of FIG. 1 and more particularly on a loader such as track loader 200, unless otherwise noted or recited, the concepts discussed below are not intended to be limited in their application to the environments specifically described above.

Figure 4:
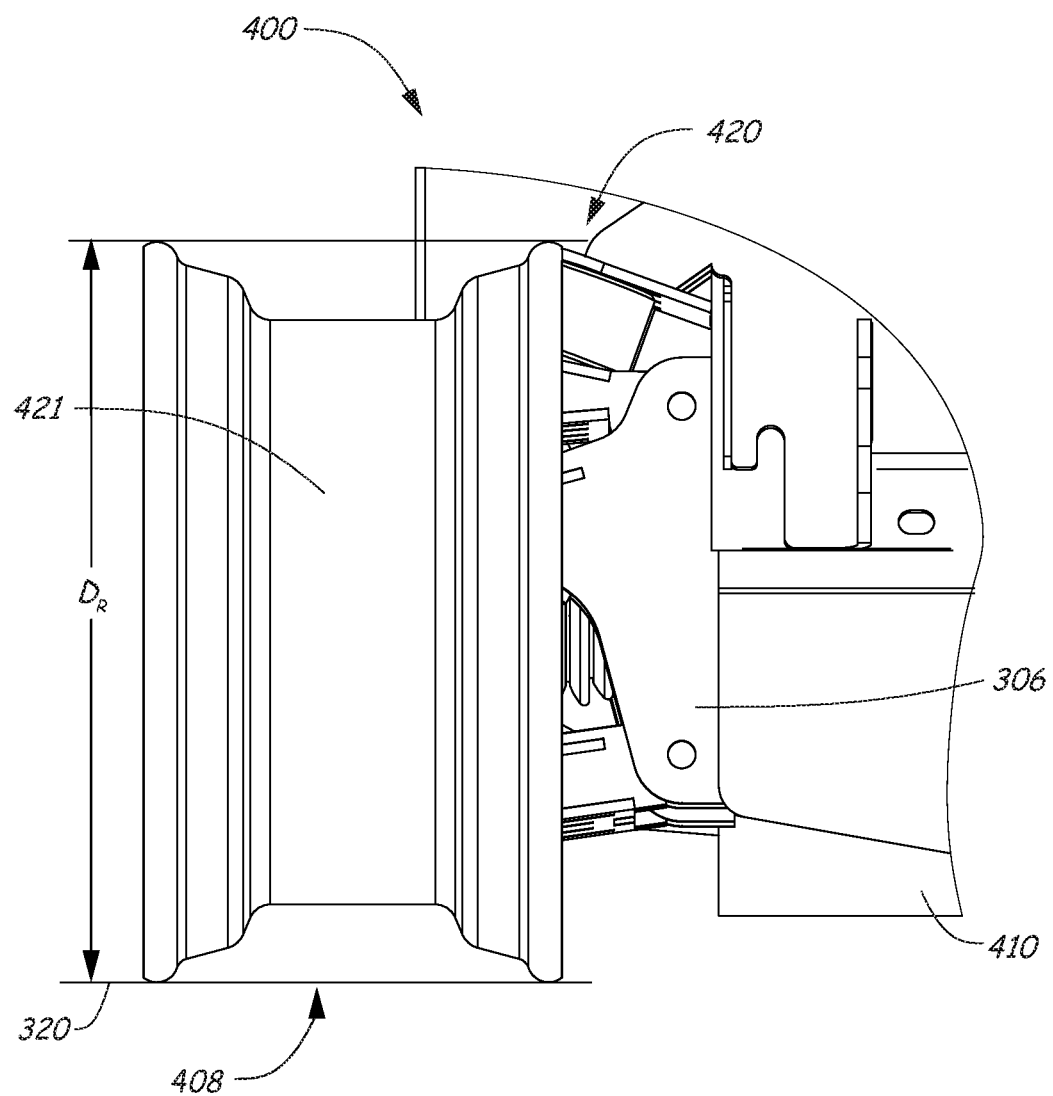
FIG. 4 is a diagrammatic illustration of a portion of a skid-steer loader as seen from a front of the loader illustrating a suspension mechanism for mounting one wheel of a skid-steer loader to a frame of the loader according to one illustrative embodiment with a rim shown mounted thereto.
Figure 5:
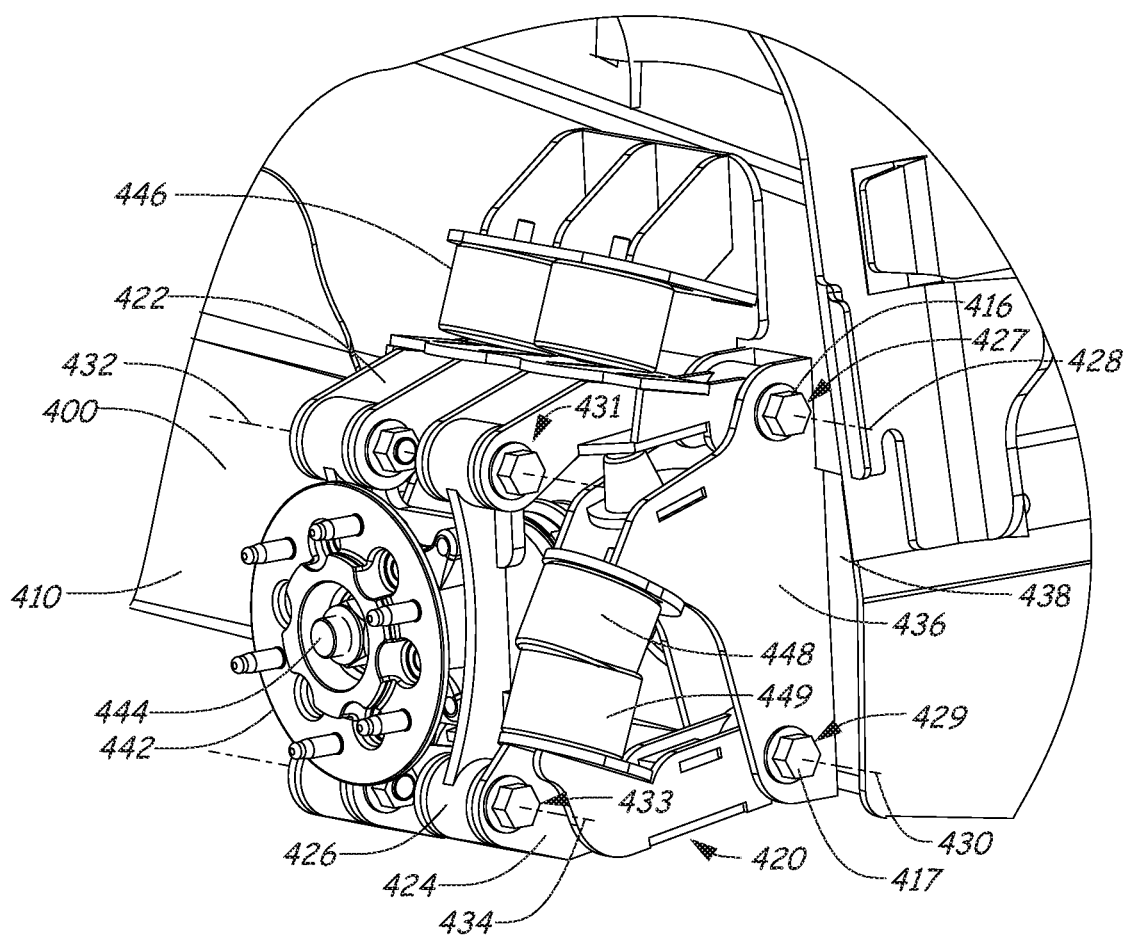
FIG. 5 is a diagrammatic illustration of the suspension mechanism shown in FIG. 4 with the rim removed to show the suspension mechanism more clearly.
Figure 10:
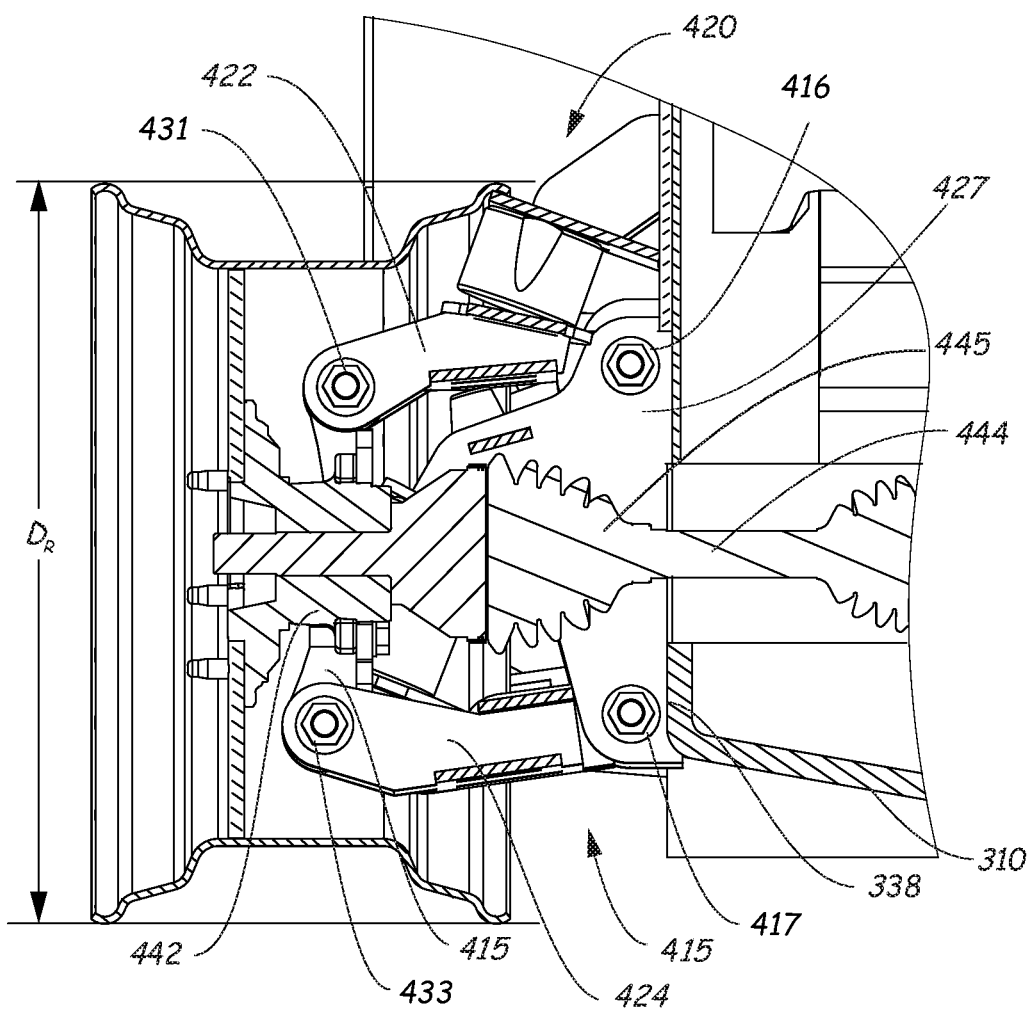
FIG. 10 is a cross-sectional view of the suspension system of FIGS. 4-5 mounted to a frame of a skid-steer loader.

FIGS. 4-5 illustrate a portion of skid-steer loader type work vehicle 400 having a suspension mechanism 420 that is provided to couple a tractive element 430 to a frame 410 of the work vehicle according to one illustrative embodiment. In FIG. 4, the tractive element 430 is represented by a rim upon which a tire can be mounted. In FIG. 5, the tractive element is removed to provide a better view of the suspension mechanism 420. The term skid-steer for the purposes of this discussion refers specifically to a vehicle that accomplishes a turn by skidding as opposed to a vehicle with steerable axles. A mechanism such as suspension mechanism 420 can be employed to operably couple all or some subset of all of the tractive elements 430 that are operably coupled to the frame 410 of the work vehicle 400. For example, in some embodiments, a work vehicle can have four tractive elements with each of the tractive elements being coupled to the frame via a suspension mechanism such as to one shown in FIG. 4. In other embodiments, only one (for example, the front) tractive element on each side of a work vehicle is operably coupled to its frame via a suspension mechanism. Work vehicle 400 is a skid-steer loader of the type illustrated in FIGS. 2 and 3 and a power machine of the type illustrated in FIG. 1. Referring to FIGS. 4 and 10, a portion of a frame 410 and a portion (i.e., the rim) of the tractive element 430, in the form of a rim 421 onto which a tire can be mounted. An axle 444 is coupleable to the hub 442 for driving the tractive element in response to control signals from a power conversion system. Axle 444 includes a joint 445 that allows for movement of the hub 442 as will occur when attached to moveable control arms as discussed below. As will be discussed below, the suspension mechanism 420 is positioned outside of the main portion of the machine frame 410. In addition, the suspension mechanism 420 is configured so that the suspension members pivot about axes that are generally parallel to a longitudinal axis of the power machine itself. Steer loader 400 also includes a plurality of wheels 408, for example typically four wheels, each having a rim 421 with an outer diameter $D_R$. While wheel 408 would typically have a tire mounted on rim 421, no tire is shown in FIG. 4. The outer diameter of rim 408 defines the volume of an imaginary cylinder 320 extending to machine frame 410. Stated another way, outer diameter $D_R$ defines the cross-sectional area of such an imaginary cylinder 220.

The suspension mechanism 420 includes a pair of control arms 422 and 424 that are pivotally mounted to the frame 410 and a wheel carrier 426 to which each of the control arms 422 and 424 are pivotally attached. In the embodiment shown in FIG. 4, control arm 422 is an upper control arm that is pivotally mounted to the frame at a joint 427 along an axis 428, which is generally parallel to a longitudinal axis of the power machine 400. The attachment at joint 427 is provided by a standard nut and bolt combination or other types of suitable fasteners. Similarly, control arm 424, which is a lower control arm, is pivotally mounted to the frame at a joint 429 along an axis 430, which is also generally parallel to a longitudinal axis of the power machine 400. The wheel carrier 426 is pivotally coupled to the upper control arm 422 at a joint 431 along an axis 432 and to the lower control arm 424 at a joint 433 along axis 434. In some embodiments, the joints 427, 429, 431, and 433 at axes 428, 430, 432, and 434 allow free movement. In other embodiments, resistance such as a torsional spring can bias some or all of the joints that connect the upper control arm 422 and the lower control arm 424 to the frame 410 and the wheel carrier 426. Frame 410 in this embodiment includes a bracket 436 that is rigidly mounted to a side wall 438 of the frame. It is to this bracket 436 to which the upper control arm 422 and the lower control arm 434 are operably coupled. When discussing the operable coupling of the control arms to the bracket, the discussion below may refer to the bracket or to the frame. For the purposes of this discussion, attachment to the bracket or the frame is an interchangeable concept. In alternative embodiments, the control arms can be attached to different portions or features of the frame 410.

Figure 6:
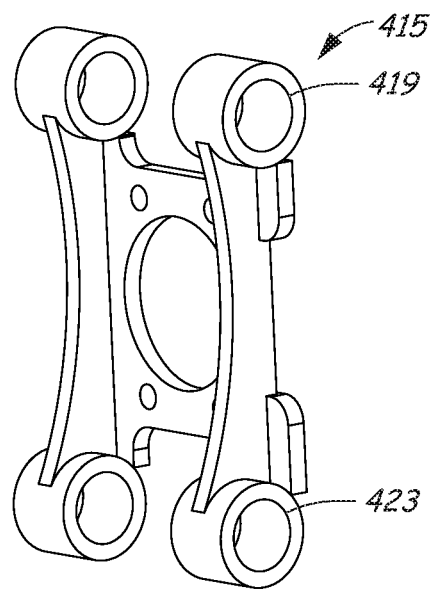
FIG. 6 is a perspective view of a wheel carrier of the suspension system shown in FIG. 5.

An embodiment of wheel carrier 415 is shown in FIG. 6. As can be seen, wheel carrier 415 can include aperture members 419 and 423 configured to receive fasteners to form portions of pivot joints 431 and 433. The bracket 427, upper control arm 422, lower control arm 424, and wheel carrier 415 form a four-bar linkage. Each of the control arms 422 and 424 are pivotally attached to the bracket 427 about generally longitudinal axes so that the control arms 422 and 424 are positioned outside the frame of the loader in some embodiments. In other embodiments, at least some portion of the control arms 422 and 424 can be located within the frame. However, the axes are not perfectly horizontal in that in that a vertical axis that passes through the suspension member is a few degrees offset from a vertical axis that passes through the frame of the machine so that the suspension members are tilted slightly forward of vertical. Of importance, in this arrangement, the components of the suspension structure 420 are not pivoting around transverse axes.

In some exemplary embodiments, the position of the pivot points between the upper and lower control arms and the machine frame and between the upper and lower control arms and the wheel carrier link are such that the instant center of the suspension system 420 is below the centerline of the wheels. This is accomplished by arrangement of the pivots and the lengths of the links. For instance, in an exemplary embodiment, the relative lengths of the upper and lower control arms 422 and 424 impact the verticality of the bottom corners of the tires. Having the upper control arm 422 longer than the lower control arm 424, or alternatively the distance between the frame pivot joint and the wheel carrier link pivot joint longer in the upper control arm as compared to the lower control arm, along with having the distance between the upper and lower pivot joints on the wheel carrier link longer than the upper and lower pivot joints on the frame, has been found to prevent unnecessary scuffing of the tires when they move under influence of the control arms.

Wheel 408 is mounted to the wheel carrier 415 by hub 442. In various embodiments, a motor, a gear box, or other devices can be operably coupled to the hub 442, though this need not be the case in all embodiments. In some embodiments, the wheel hub 442 can be integrated into the wheel carrier 415. In some exemplary embodiments, the wheel 408 is mounted to the wheel carrier by rim 421 such that pivotal attachments 416 and 417 of the upper and lower control arms 422 and 424 to the bracket 438, and pivotal attachments 431 and 433 of the upper and lower control arms to the wheel carrier 415 are all contained within a cylinder 320 defined by the outer diameter $D_R$ of the rim 421. This allows for a compact structure as the rim 421 fits over the wheel carrier link 415, and at least part of the control arms 422 and 424 are positioned within the volume defined by the rim when the loader is in a resting position. In some embodiments, the upper control arm 422, the lower control arm 424 and the wheel carrier or wheel carrier link 415 are all entirely contained within the cylinder 320, while in other embodiments portions of these components, such as portions of the upper and lower control arms, can be outside of the cylinder. In some exemplary embodiments, the pivotal attachments of the upper and lower control arms to the frame and the pivotal attachments of the upper and lower control arms to the wheel carrier are all positioned outside of an outer frame wall 438 of the frame.

In accordance with some exemplary embodiments, a type and positioning of spring members within suspension system or mechanism 420 aid in achieving a compact structure. These spring members and their corresponding attachment structures and positioning are described below with reference to FIGS. 5 and 7-9. The suspension mechanism 420 includes a plurality of spring mechanisms 446 and 448 that are coupled to bracket 436 and spring mechanisms 449 that are coupled to the lower control arm 424. Spring members 446, 448, and 449 are compressible bumper spring members, but in alternate embodiments other types of spring structures can be employed.

Lower or first spring members 448 and 449 are configured to engage between the bracket 427 and the lower control arm 424. Spring members 448 are attached to the bracket 427 and are free from attachment with the lower control arm 424.

Spring members 449 are attached to the lower control arm 424 and are free from attachment with the bracket 427. As shown in FIG. 5, in some embodiments, the spring members 448 and 449 are positioned entirely between the upper control arm 422 and the lower control arm 424, meaning that they do not extend outside of a volume defined by the positions of the upper and lower control arms. This advantageously provides for a spring mechanism of compact size as use of a bumper type spring acting on a lower of two control arms in a four-bar linkage provides improved performance, while aiding in achieving a compact configuration. Although not clearly shown in FIG. 5, there are two each of spring members 448 and 449, positioned on opposing sides of wheel carrier 426.

The second, upper spring mechanisms 446 positioned between the bracket 436 and the upper control arm 422 and in the embodiment shown are free from attachment with the upper control arm. The upper spring mechanisms 446 provide a dampening effect between the upper control arm 422 and the bracket 436. In other embodiments, the spring mechanisms 446 can be attached to the upper control arm 422 and free from attachment to the bracket 436. In some exemplary embodiments, the second, upper spring members 446 are only included on suspension systems of the front wheels of the loader or power machine, while suspensions of other wheels can include only the first, lowerspring members or members engaging between the frame and the lower control arm. This allows the power machine suspensions to provide different responses when the machine is loaded (e.g., with up to 70% of the weight distributed to the front) and unloaded (with approximately 70% of the weight distributed to the rear).

Figure 7:
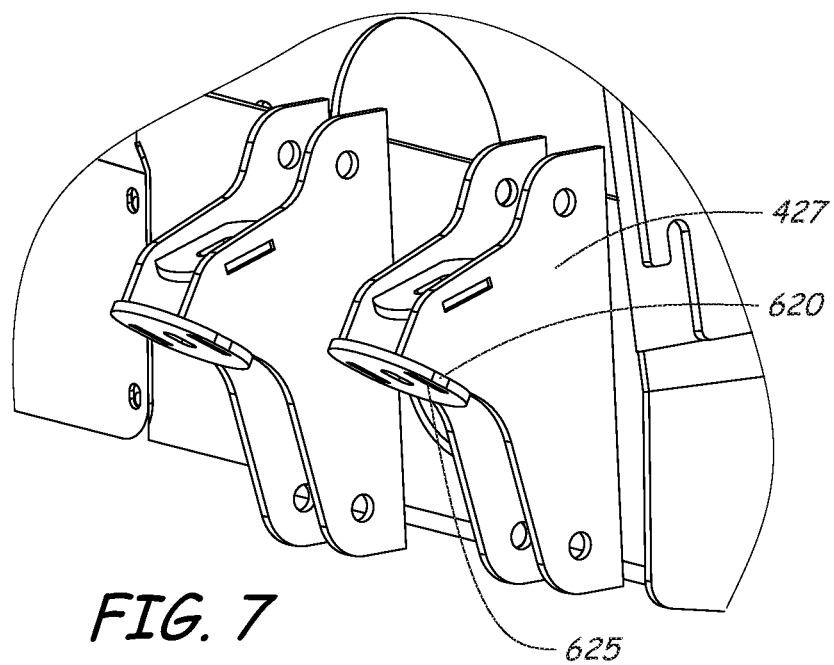
FIG. 7 is a perspective view of a bracket that is mounted to a frame of the skid steer loader of FIG. 4 and is configured to be operably coupled to control arms of the suspension system of FIGS. 4-5.

In some exemplary embodiments, the first, lower spring members 449 and/or the second, upper spring members 446 are attached to the bracket using a slotted attachment mechanism which allows a position of the spring member(s) to be adjustable within a slot to adjust or configure the spring forces for particular machines or uses. For example, FIG. 7 illustrates slotted attachment mechanism 620 attached to bracket 427 and having slots 625 which allow the position of spring member 448 (not shown in FIG. 7) to be adjusted laterally relative to the frame and/or the lower control arm. Alternatively, the springs can be adjusted with shims, which will allow for changing ride height as well as adjusting spring rate.

Figure 9:
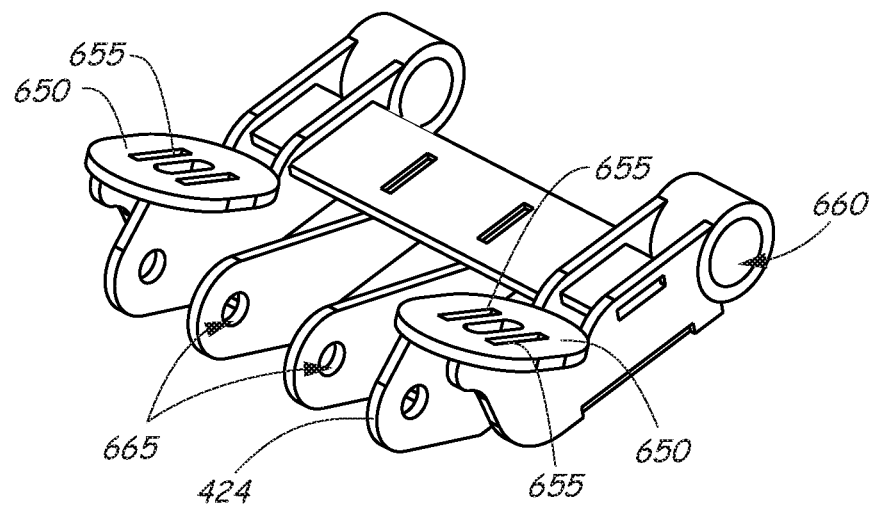
FIG. 9 is a is a perspective view illustration of a lower control arm of the suspension system shown in FIGS. 4-5 and configured to be operably coupled to the bracket of FIG. 7.

In other embodiments, slotted attachment mechanism can instead be attached to the lower control arm 424. For example, FIG. 9 illustrates attachment mechanisms 650 attached to lower control arm 424 and having slots 655 for positioning a spring member. FIG. 9 also illustrates attachment apertures 660 and 665 on lower control arm 424 for use in forming the pivot joints to the frame and to the wheel carrier link.

Figure 8:
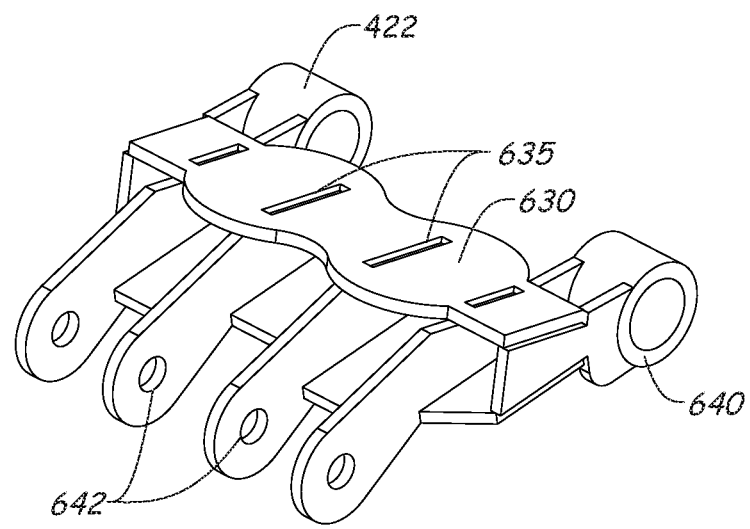
FIG. 8 is a perspective view illustration of an upper control arm of the suspension system shown in FIGS. 4-5 and configured to be operably coupled to the bracket of FIG. 7.

Similarly, FIG. 8 illustrates slotted attachment mechanism 630 attached to upper control arm 422 and having slots 635 which allow the second spring member(s) 446 (not shown in FIG. 9) to be adjusted within the slots to change the position of the spring member laterally relative to the frame or upper control arm. As discussed above, in some embodiments, the spring members 446 are coupled to bracket 427 and as such, slotted attachment mechanism 630 can alternatively be attached to frame or bracket 427 in other embodiments. FIG. 8 also illustrates attachment apertures 640 and 642 on upper control arm 422 for use in forming the pivot joints to the frame and to the wheel carrier link.

In these or other embodiments, the suspension system 420 can also be configured to enhance performance under different operating and load conditions of the loader or power machine by using spring members with different spring rates. In some exemplary embodiments, the first spring member(s) 488, 489 engaging between the lower control arm and the frame have a higher spring rate than the second spring member(s) 486 engaging between the upper control arm and the frame.

Although the present invention has been described with reference to preferred embodiments, workers skilled in the art will recognize that changes may be made in form and detail without departing from the spirit and scope of the invention.

What is claimed is:

1. A skid steer loader comprising:
a frame having an outer frame wall and a bracket rigidly mounted to the outer frame wall;
a wheel having a rim with an outer diameter; and
a suspension system coupling the wheel to the frame, the suspension system comprising:
an upper control arm pivotally attached to the bracket;
a lower control arm pivotally attached to the bracket; and
a wheel carrier pivotally attached to the upper control arm and the lower control arm, the wheel being mounted to the wheel carrier such that pivotal attachments of the upper and lower control arms to the bracket and pivotal attachments of the upper and lower control arms to the wheel carrier are all contained within a cylinder defined by the outer diameter of the rim of the wheel.

2. The skid steer loader of claim 1, wherein the upper control arm, the lower control arm and the wheel carrier are all entirely contained within the cylinder defined by the outer diameter of the rim of the wheel.

3. The skid steer loader of claim 1, and further comprising a first spring member configured to engage between the frame and one of the upper and lower control arms, wherein the first spring member is attached to one of the frame and the one of the upper and lower control arms, the first spring member being free from attachment to the other of the frame and the one of the upper and lower control arms.

4. The skid steer loader of claim 3, wherein the first spring member is attached to one of the frame and the lower control arm.

5. The skid steer loader of claim 4, wherein the first spring member comprises a first bumper.

6. The skids steer loader of claim 4, and further comprising a second spring member configured to engage between the frame and the upper control arm, the second spring member attached to one of the frame and the upper control arm.

7. The skid steer loader of claim 4, wherein the first spring member is attached to the one of the frame and the lower control arm using a slotted attachment mechanism such that a position of the first spring member is adjustable within a slot of the slotted attachment mechanism.

8. The skid steer loader of claim 1, wherein the pivotal attachments of the upper and lower control arms to the bracket and the pivotal attachments of the upper and lower control arms to the wheel carrier are all positioned outside of the outer frame wall of the frame.

9. The skid steer loader of claim 1, wherein the wheel carrier is a rigid link with a hub mounted thereto.

10. A skid steer loader comprising:
a frame;
a wheel having a rim with an outer diameter;

a suspension system coupling the wheel to the frame, the suspension system comprising:
- an upper control arm pivotally attached to the frame;
- a lower control arm pivotally attached to the frame;
- a wheel carrier pivotally attached to the upper control arm and the lower control arm, the wheel being mounted to the wheel carrier; and
- a first spring member configured to engage between the frame and one of the upper and lower control arms, wherein the first spring member is attached to one of the frame and the lower control arm, the first spring member being free from attachment to the other of the frame and the lower control arm.

11. The skid steer loader of claim 10, wherein the first spring member comprises a first bumper.

12. The skid steer loader of claim 10, wherein the first spring member is attached to the one of the frame and the lower control arm using an attachment mechanism which provides lateral position adjustment of the first spring member relative to the one of the frame and the lower control arm.

13. The skid steer loader of claim 10, wherein the first spring member is attached to the one of the frame and the lower control arm in a position such that the first spring is entirely positioned between the upper and lower control arms.

14. The skids steer loader of claim 10, and further comprising a second spring member attached to one of the frame and the upper control arm and free from attachment to the other of the frame and the upper control arm, the second spring configured to engage between the frame and the upper control arm.

15. A skid steer loader having a frame and four wheels attached to the frame, the attachment of each wheel being accomplished by a different one of four independent suspension mechanisms, one of the independent suspension mechanisms comprising:
- an upper control arm pivotally attached to the frame;
- a lower control arm pivotally attached to the frame;
- a wheel carrier pivotally attached to the upper control arm and the lower control arm, the wheel carrier configured to have the wheel mounted thereto;
- a first spring attached to one of the frame and the upper control arm and positioned to engage the other of the frame and the upper control arm; and
- a second spring attached to one of the frame and the lower control arm and positioned to engage the other of the frame and the lower control arm.

16. The skid steer loader of claim 15, and further comprising front and rear axles coupled to the frame such that the front and rear axles are incapable of turning.

17. The skid steer loader of claim 15, wherein the one of the independent suspension mechanisms further comprising a third spring attached one of the frame and the upper control arm and positioned to engage the other of the frame and the upper control arm.

18. The skid steer loader of claim 17, wherein the one of the independent suspension mechanisms further comprising a fourth spring attached one of the frame and the lower control arm and positioned to engage the other of the frame and the lower control arm.

19. The skid steer loader of claim 15, wherein the first spring and second spring have different spring rates.

20. The skid steer loader of claim 19, wherein the first spring has a higher spring rate than the second spring.

* * * * *